Patented Apr. 4, 1944

2,345,574

UNITED STATES PATENT OFFICE 2,345,574

PROCESS OF POLYMERIZING UNSATURATED HYDROCARBONS

Robert E. Burk, Cleveland Heights, Ohio, assignor to The Standard Oil Company, Cleveland, Ohio, a corporation of Ohio No Drawing. Application November 15, 1940, Serial No. 365,815

6 Claims. (Cl. 260—683.15)

Olefins such as ethylene and propylene are, as well known, very difficult to polymerize successfully with catalysts such as boron trifluoride. I have now found however that by proceeding as set forth more in detail hereinafter, such olefins may be polymerized very easily, and it is not even necessary that they be in relatively high concentration or pure state.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The raw material to be polymerized may be propylene, or ethylene, butylenes, etc., or any olefin desired or olefin mixture or olefin and paraffin mixture. The olefin may be diluted with the corresponding paraffin or with other inert hydrocarbon gas which boils at approximately the same or below the boiling point of the olefin. Fractionated refinery gases containing olefins and paraffins may be used without separation. The olefin to be polymerized is supplied to the polymerizing vessel or zone, and boron fluoride is employed in large amount, more than what is commonly regarded as a catalytic amount, and for instance may be on the order of mol ratios of 1:1 or greater of boron fluoride to the olefin, elevated pressure such as 50–720 pounds per square inch, and preferably in the range 100–400 pounds, being used. The reactants thus are conveniently fed in liquid phase, and the total pressure in the reaction zone is the sum of the partial pressures of the catalyst and hydrocarbons. The operating pressure level is determined essentially by the partial pressure of boron fluoride, which in general exceeds the partial pressure of the olefin. Olefin is fed at minus 20° to plus 75° C. into the catalyst and reaction zone with suitable cooling to maintain the temperature at the desired level. In general, the temperature should be closely controlled if uniform products are to be obtained.

As an example: Propylene in a mixture with 60 per cent propane is supplied to a pressure reaction zone in additions at intervals, making up a total feed of 146 parts by weight, the reaction zone having been supplied with boron fluoride to 85.7 initial mol per cent concentration, the pressure of BF$_3$ being 300 pounds per square inch, and the temperature 0° C. Vapors from the reaction zone under such maintained pressure are passed through a condenser system and reflux is returned. In a reaction time of 4½ to 5½ hours, a yield of 93.8 per cent in liquid product is obtained, having a boiling point of 260° C. and over, viscosity 130.36 centistokes, and density 0.836. In contrast, at atmospheric pressure, and with boron fluoride in 2.3 mol per cent, the yield of polymer product was only a trace, and this of boiling point in the gasoline range.

Other modes of applying the principle of the invention may be employed, change being made as regards the details described, provided the features stated in any of the following claims, or the equivalent of such, be employed.

I therefore particularly point out and distinctly claim as my invention:

1. A process of polymerizing unsaturated hydrocarbons to produce a polymer product of relatively high viscosity, which comprises subjecting an unsaturated hydrocarbon to boron fluoride as a catalyst in such form that the boron fluoride is catalytically active as such, at a temperature of —20° to 75° C., and with an initial mol ratio of over 1:1 of boron fluoride to said hydrocarbon, and maintaining the boron fluoride partial pressure at least about 300 pounds per square inch in the reaction zone.

2. A process of polymerizing unsaturated hydrocarbons having not more than three carbon atoms to produce a polymer product of relatively high viscosity, which comprises subjecting said unsaturated hydrocarbons to boron fluoride as a catalyst in such form that the boron fluoride is catalytically active as such, at a temperature of —20° to 75° C., and with an initial mol ratio of over 1:1 of boron fluoride to said hydrocarbon, and maintaining the boron fluoride partial pressure at least 300 pounds per square inch in the reaction zone.

3. A process of polymerizing propylene to produce a polymer product of relatively high viscosity, which comprises subjecting propylene to boron fluoride as a catalyst in such form that the boron fluoride is catalytically active as such at a temperature of —20° to 75° C., and with an initial mol ratio of over 1:1 of boron fluoride to propylene, and maintaining the boron fluoride partial pressure at least about 300 pounds per square inch in the reaction zone.

4. A process of polymerizing unsaturated hydrocarbons to produce a polymer product of relatively high viscosity, which comprises subjecting an unsaturated hydrocarbon to boron fluoride as a catalyst in such form that the boron fluoride is catalytically active as such, at a temperature of —20° to 75° C., and with an amount of boron fluoride such that the partial pressure of the boron fluoride exceeds the partial pressure of the unsaturated hydrocarbon, and maintaining a partial pressure of boron fluoride of at least about 300 pounds per square inch in the reaction zone.

5. A process of polymerizing unsaturated hydrocarbons having not more than three carbon atoms to produce a polymer product of relatively high viscosity, which comprises subjecting said unsaturated hydrocarbon to boron fluoride as a catalyst in such form that the boron fluoride is catalytically active as such, at a temperature of —20 to 75° C., and with an amount of boron fluoride such that the partial pressure of the boron fluoride exceeds the partial pressure of the unsaturated hydrocarbon, and maintaining a partial pressure of boron fluoride of at least about 300 pounds per squre inch in the reaction zone.

6. A process of polymerizing propylene to produce a polymer product of relatively high viscosity, which comprises subjecting propylene to boron fluoride as a catalyst in such form that the boron fluoride is catalytically active as such, at a temperature of —20 to 75° C., and with an amount of boron fluoride such that the partial pressure of the boron fluoride exceeds the partial pressure of the propylene, and maintaining a partial pressure of boron fluoride of at least about 300 pounds per square inch in the reaction zone.

ROBERT E. BURK.